United States Patent [19]

Marmonier et al.

[11] 4,157,277

[45] Jun. 5, 1979

[54] DEVICE FOR MEASURING NEUTRON FLUX IN A NUCLEAR REACTOR

[75] Inventors: Pierre L. Marmonier, Aix-en-Provence; Jean Moreau, Manosque; Jean-Claude Nervi, Oraison, all of France

[73] Assignee: Commissariat a l'Energie Atomique, Paris, France

[21] Appl. No.: 834,970

[22] Filed: Sep. 20, 1977

[30] Foreign Application Priority Data

Sep. 21, 1976 [FR] France .................. 76 28334

[51] Int. Cl.² ............................................. G21C 17/00
[52] U.S. Cl. ............................................. 176/19 J
[58] Field of Search ............... 176/19 R, 19 J, 19 EC

[56] References Cited
U.S. PATENT DOCUMENTS

| 3,751,333 | 8/1973 | Drummond et al. | 176/19 R |
|---|---|---|---|
| 3,802,962 | 4/1974 | Culambourg et al. | 176/19 R |
| 3,827,935 | 8/1974 | Gruner et al. | 176/19 R |
| 3,910,816 | 10/1975 | Tsuji et al. | 176/19 R |

Primary Examiner—Samuel W. Engle
Assistant Examiner—S. A. Cangialosi
Attorney, Agent, or Firm—Cameron, Kerkam, Sutton, Stowell and Stowell

[57] ABSTRACT

A neutron guide constituted by two superposed and separable tubular elements extends from the reactor core to the immediate vicinity of the bottom wall of the reactor vessel directly above a neutron detection chamber located outside the vessel. The upper element containing a neutron-emissive medium comprises a closed tube filled with inert gas and engaged coaxially with the lower element which is positioned within a support sleeve. The lower element is provided with another closed sleeve filled with inert gas and terminating near the internal surface of the bottom of the reactor vessel.

9 Claims, 4 Drawing Figures

DEVICE FOR MEASURING NEUTRON FLUX IN A NUCLEAR REACTOR

This invention relates to a device for measuring neutron flux in a liquid-cooled nuclear reactor and is more particularly applicable to fast-neutron power reactors which are cooled by a circulation of liquid sodium.

In reactors of this type, it is known that provision has to be made for means whereby the flux of neutrons derived from the reactor core can be measured continuously both at the time of reactor start-up and during operation at power. Neutron flux is customarily measured by means of instruments known as neutron chambers in which the incident flux impinges upon a suitable emitter, thus producing a nuclear reaction with emission of particles, the value of neutron flux being measured by counting the particles. It is conventional practice, for example, to employ helium chambers or chambers containing a deposit of metallic boron or boron carbide, the incident neutrons being intended to determine the emission of alpha particles which are then counted by a detector. In the case of all neutron chambers, however, the incident flux must necessarily be of sufficiently high value to permit of accurate measurement. This makes it necessary both to place the chamber as close as possible to the reactor core and to protect the chamber against gamma radiation which would impair the accuracy of the measurement. In order to meet the requirement just mentioned, the usual method consists in employing two mutually compensated chambers, one chamber being sensitive to gamma rays and to neutrons whilst the other chamber is mounted in opposition with respect to the first and sensitive only to gamma rays. Moreover, it is preferable to ensure that the measuring chamber is maintained at a relatively low temperature and finally that it is readily accessible for maintenance or replacement.

In order to meet the foregoing requirements, it has already been proposed to place a neutron chamber outside and beneath the bottom wall of the reactor vessel in the immediate vicinity of this latter. In practice, however, the flux received by the chamber is attenuated by its passage through a number of metallic walls and especially through an appreciable volume of sodium. This makes the measurement inaccurate, especially at the time of reactor start-up at which the flux is of lower value. In another alternative design, it has already been proposed to mount the chamber within a vertical thimble placed within the protective blanket which surrounds the fuel zone of the core, the opening of the thimble being located at the upper end of the reactor in order to permit of introduction or withdrawal of the chamber. However, this solution is also subject to disadvantages, especially in the case of high-power reactors. In fact, the presence of these thimbles is liable to hinder fuel-handling operations within the reactor core and to entail the need for telescopic and removable thimbles. This clearly complicates the arrangement of the thimbles and these latter are also liable to be subjected to vibrations induced by the flow of liquid coolant.

In U.S. Pat. No. 3,802,962 filed Jan. 19, 1972 issued in the name of COMMISSARIAT A L'ENERGIE ATOMIQUE the practical application of neutron chambers of this type has been improved to a very appreciable extent by means of a tubular enclosure filled with neutral gas and positioned vertically above each chamber which is located beneath the reactor vessel and externally of this latter. Said enclosure extends from the reactor core to the vicinity of the internal wall of the bottom of the reactor vessel and serves to guide the neutron flux from the reactor core to said chamber, thus reducing the thickness of the layer of sodium to be traversed and the metallic walls which are interposed on the path towards said chamber.

This invention relates to a novel improvement in the design solution recalled in the foregoing. This improvement makes it possible to carry out an even more accurate and more sensitive measurement of the neutron flux, even in the case of very low operating regimes of the reactor.

To this end, the device under consideration is adapted to a nuclear reactor comprising a vessel containing a liquid medium for cooling the reactor core formed by the juxtaposed arrangement of fertile fuel assemblies and blanket assemblies disposed in a vertical position. Each assembly has an open-topped wrapper having an axial extension in the form of a bottom end-fitting for positioning the assembly in a diagrid by means of a support sleeve in which said endfitting is inserted. The device aforesaid comprises at least one neutron detection chamber placed beneath the reactor vessel externally and as close as possible thereto and a neutron guide located vertically above said detection chamber and constituted by a tubular casing occupied at least partially by an inert gas and extending from the reactor core to the immediate vicinity of the bottom of the reactor vessel, said casing being provided with a wrapper having an external profile which is identical with that of the reactor core assemblies and a positioning end-fitting which penetrates into a support sleeve of the diagrid. The device is distinguished by the fact that the neutron guide is constituted by two superposed separable elements. The first and upper element contains on the one hand a neutron-emissive medium which extends at least over the greater part thereof above the central plane of the reactor core and on the other hand, beneath said emissive medium, a closed tube filled with inert gas and engaged coaxially within the second and lower element. Said second element is positioned within the interior of the support sleeve and terminates at the lower end thereof in another closed tube filled with inert gas and placed in the line of extension of the closed tube of the first element so as to terminate in the vicinity of the internal surface of the bottom of the reactor vessel.

Further distinctive features of a device for measuring neutron flux as designed in accordance with the invention will become apparent from the following description of one exemplified embodiment which is given by way of indication without any limitation being implied, reference being made to the accompanying drawings, wherein.

Figure 1:
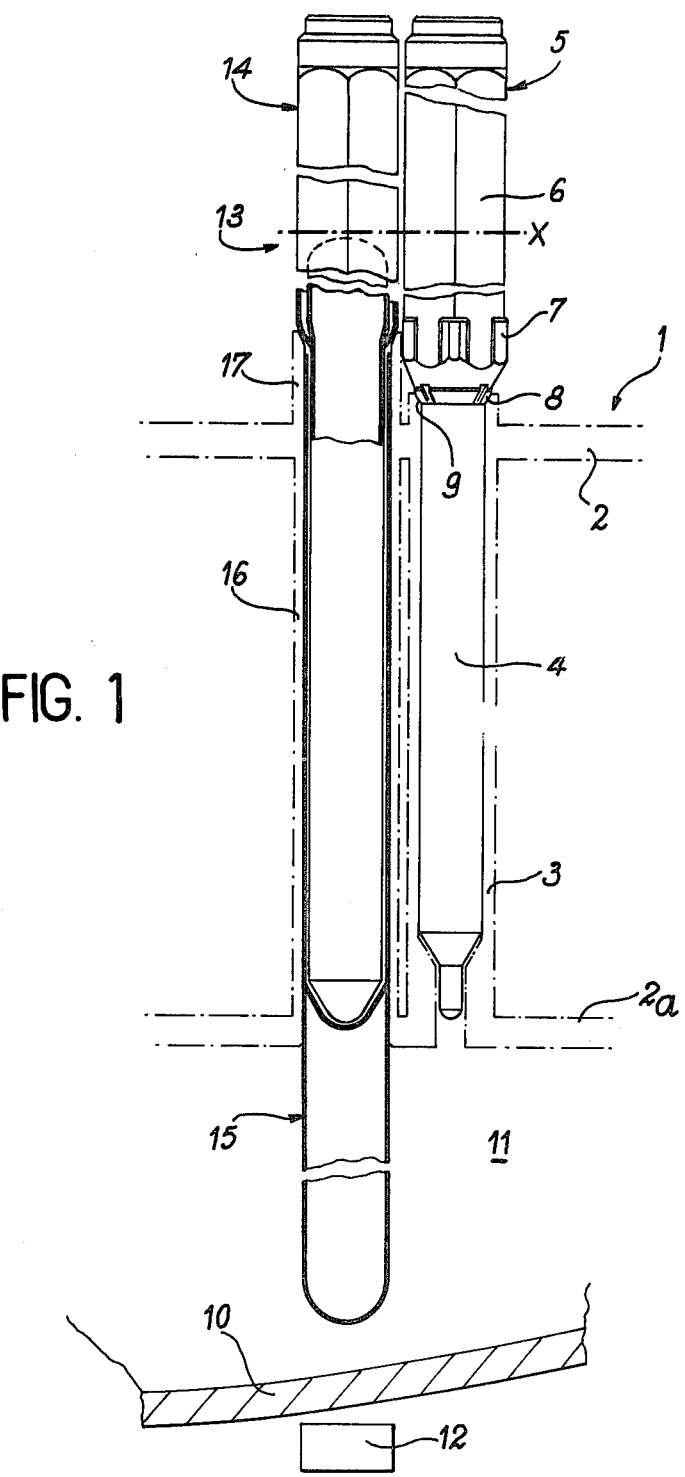
FIG. 1 is a diagrammatic longitudinal part-sectional view of the diagrid for supporting a nuclear reactor core in which the device under consideration is mounted so as to enable a measuring chamber located outside the reactor vessel to receive a suitable neutron flux under all circumstances.

In FIG. 1, the reference numeral 1 designates diagrammatically a portion of the support diagrid of a nuclear reactor, especially of the type known as a fast reactor and cooled by a circulation of liquid coolant, especially liquid sodium. Said diagrid 1 is mainly composed of two parallel and horizontal plates designated respectively by the references 2 and 2a and braced by a series of support sleeves 3 which are intended to receive the end-fittings 4 of assemblies 5, the juxtaposed array of which constitutes the reactor core. Each assembly comprises in particular an open-topped wrapper having a parallelepipedal cross-section, the lower end of which is joined to its end-fitting 4, said assembly being maintained in the vertical position by engaging said end-fitting within a support sleeve 3 of the diagrid. Projecting lugs 7 for final angular positioning of the wrappers are formed at the lower end of the wrapper 6 which usually contains a bundle of pins of fertile or fissile nuclear material (not shown). The diagrid 1 supports each assembly 5 by means of a bearing surface 8 of generally spherical shape and formed at the lower end of the wrapper 6. Said bearing surface 8 is intended to rest on a seating 9 which is usually of conical shape and formed on the upper edge of the corresponding support sleeve 3 slightly above the horizontal plate 2 of the diagrid.

The reactor core formed by all the assemblies 5 supported on the diagrid 1 is placed within a vessel 10, only a small portion of which is illustrated in FIG. 1. Said vessel 10 contains in particular the volume 11 of liquid sodium which is necessary for cooling the reactor core during operation. In particular, the sodium within the reactor vessel is intended to flow through the reactor core in contact with the assembly wrappers in the upward direction after penetrating into said assemblies through the endfittings 4 of these latter which are accordingly provided with lateral openings (not shown). The sodium then flows within the wrappers and finally passes out of these latter through the open-topped end thereof.

As has already been recalled in the foregoing, it must be possible to associate a nuclear reactor of the above-mentioned type with means for continuously measuring the neutron flux emitted by the reactor core both at the time of reactor start-up and during operation at full power. However, neutron chambers which are at present available and make it possible to carry out a measurement of this type are so designed that they cannot be mounted within the volume of liquid sodium in the reactor vessel. On the contrary, these chambers have to be placed outside the reactor vessel but as close as possible to this latter, one chamber of this type having been shown diagrammatically at 12 in FIG. 1. Under these conditions, the neutron flux at the level of the reactor core and in particular within the central region of this latter can reach the chamber 12 only after passing through a certain volume of sodium and through a series of walls or metallic components which have the effect of attenuating the flux and do not permit of accurate and reproducible measurement, especially at low power levels.

In order to overcome this disadvantage and in accordance with the invention, it is proposed to mount within the reactor core at least one neutron guide for suitably directing these latter from the central zone of the reactor core to the immediate vicinity of the neutron chamber which is located outside the reactor vessel.

The neutron guide which is employed and generally designated in the figures by the reference numeral 13 is made up of two separable elements 14 and 15 respectively which are capable of fitting one inside the other. Said guide is mounted in a vertical position through a suitable orifice of the diagrid 1 and takes the place of a nuclear assembly. To this end, the guide 13 is provided especially in its upper element 14 with an outer casing having a cross-section and profile which are similar to the wrappers 6 of the assemblies 5. Said element 14 of the guide 13 also rests on a support sleeve 16 formed in the diagrid 1 and provided with an extension 17 at the upper end thereof above the horizontal plane 2. The structure of said support sleeve is slightly different from the sleeve which receives the end-fittings 4 of the assemblies 5 as shown in greater detail in FIG. 2 which will be described below.

Figure 2:
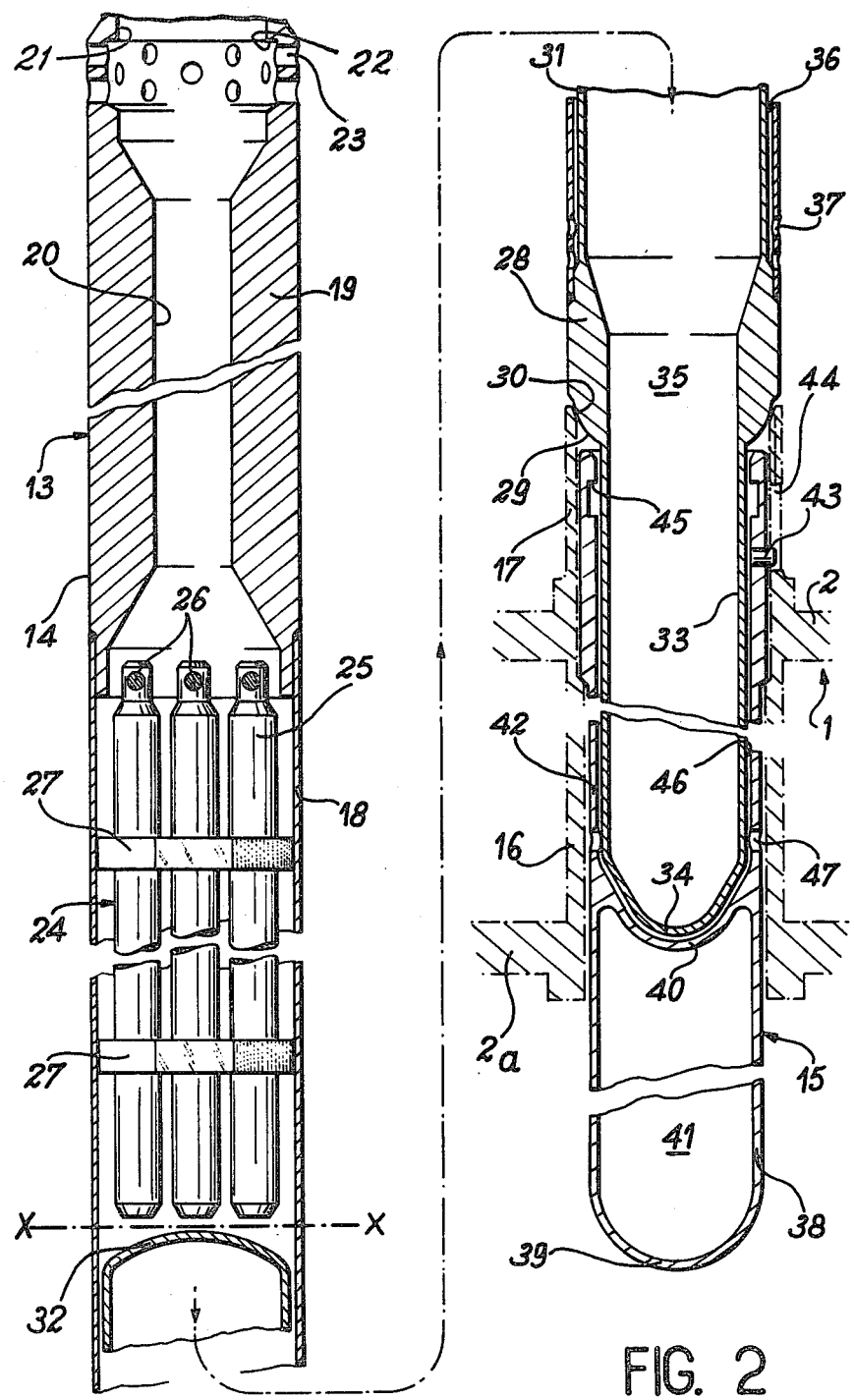
FIG. 2 is a part-sectional view to a larger scale showing the neutron guide employed in the construction of the device under consideration.

Referring to FIG. 2, the upper element 14 of the guide 13 in fact mainly comprises a wrapper 18 which has an upper extension in the form of a head 19 having a wall of greater thickness and constituting what is usually designated as the top neutron shield in the case of the assemblies 5. Said head 19 is provided with an axial duct 20 for the upward flow of coolant liquid through the guide and through the assemblies. The duct 20 extends to its open end 21 and is provided beneath this latter with a groove 22 for the purpose of handling the guide 13 by means of a suitable tool (not shown). Orifices 23 are formed at the top portion of the head 19 in order to permit sufficient cooling of said head by natural convection in the event of stoppage of the circulation through the reactor core.

There is mounted beneath the head 19 within the wrapper 18 a bundle 24 formed by a series of stainless steel pins 25 immersed in sodium. This assembly constitutes a neutron-emissive medium (the function of which will be explained hereinafter) and is located over the greater part of its length above the central plane X—X of the reactor core. The pins 25 are supported at the upper ends by means of transverse locking-pins 26 which are rigidly fixed to the head 19. Bracing between the pins 25 in the bundle 24 is carried out by means of spacer grids 27 which are fixed by any suitable means on the pins themselves. An internal collar 28 is formed at the lower end of the wrapper 18 and provided externally with a spherical bearing surface 29 for applying said collar against a conical seating 30 provided at the upper extremity of the end-piece 17 which forms an extension of the support sleeve 16. It should be noted that said endpiece 17 extends to a sufficient height above the horizontal plate 2 of the diagrid 1 to ensure that the level of application of the bearing surface 29 against its seating 30 is located at a substantially greater height than that of the point of contact of the bearing surfaces 8 of the core assemblies 5 with their support 9 on the diagrid. This arrangement makes it possible, especially at the time of loading of the reactor core, to observe immediately any faulty positioning of an assembly when one of these latter is inadvertently placed in the position of the guide 13 or conversely, in which case the top levels of the wrappers 6 and 18 are displaced in a corresponding manner, thus permitting the immediate detection of these latter.

The junction collar 28 provided at the lower end of the wrapper 18 has an upward extension so as to form the wall of a tubular receptacle 31, the upper portion of which is closed by an end-wall 32 located beneath the lower end of the bundle of needles 25. Said tubular receptacle 31 is also provided beneath the collar 28 with an extension in the form of a tube element 33 which is closed at the lower end 34, thus defining an enclosed space 35 which is filled with an inert gas and especially argon. The receptacle 31 defines with the internal wall of the wrapper 18 an annular space 36 which is continuously supplied with the coolant liquid located around the end-fittings 4 of the assemblies 5 by virtue of holes 37 formed at the base of the wrapper. Said liquid flows by natural convection within said space 36, comes into contact with the pins 25 and cools these latter before escaping through the bore 20 and the open-topped end 21 of the wrapper 18.

In accordance with the invention, the lower element 15 of the guide 13 is constituted by a tube 38 closed by a bottom end-wall 39 and provided at the opposite end with an internal diaphragm 40 which defines a second enclosed space 41 located in the line of extension of the space 35 of the first element 14. Said tube 38 has an extension above the diaphragm 40 in the form of an open sleeve 42 disposed in coaxial relation with the tube 33 and provided at a suitable height with laterally projecting studs 43. Said studs are capable of cooperating with elbowed grooves 44 formed in the extension or end-piece 17 so as to constitute a bayonet-type assembly for securing the lower element 15 to the support sleeve 16. As an advantageous feature, said element 15 has an internal groove 45 which permits handling and especially withdrawal of the element from the reactor core after removal of the first element 14.

At the time of assembly, the first element 14 is engaged within the second element 15; the space 46 thus defined between the tube 33 and the sleeve 42 communicates with the exterior within the support sleeve 16 by means of holes 47, thus providing a passageway for the coolant liquid.

Figure 3:
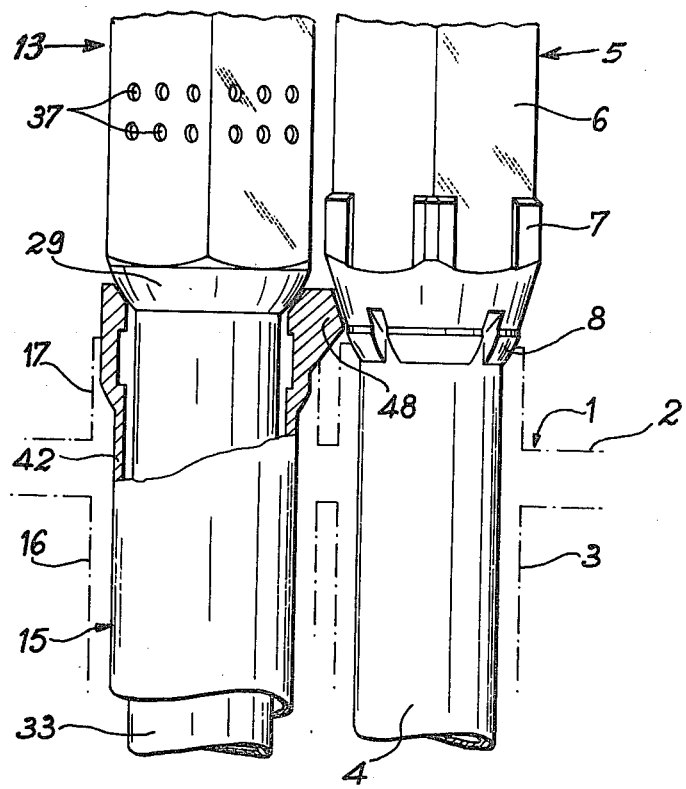
FIG. 3 illustrates a detail of the device in accordance with another alternative embodiment.
Figure 4:
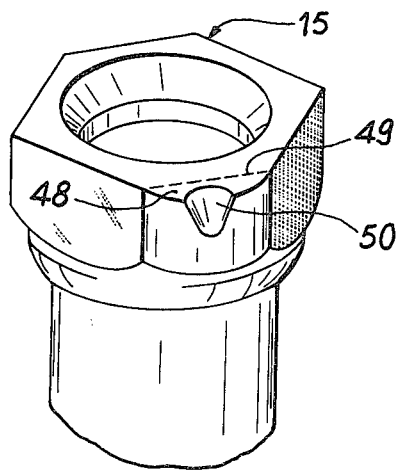
FIG. 4 is a view in partial perspective showing the top portion of the second element in accordance with the alternative embodiment of FIG. 3.

In another alternative embodiment which is illustrated in FIGS. 3 and 4, the lower portion or second element 15 of the guide 13 is again provided with an open extension sleeve 42 in coaxial relation with the tube 33. In this case, however, said sleeve is not secured to the end-piece 17 and consequently to the support sleeve 16 but is provided at the upper end with a simple laterally projecting ledge 48 which is located above the end-piece 17 and extends beyond the contour of this latter. Said ledge 48 is capable of cooperating with the adjacent assembly within the reactor core above its bottom bearing surface 8 at the lower end of the wrapper 6, the assembly being intended to lock the element 15 in position once it has been inserted in the support diagrid 1. By virtue of this arrangement, the first element 14 can readily be demounted by withdrawing it vertically in the upward direction without having to perform any operation on the second element 15; exceptional removal of this latter only entails the need for momentary withdrawal of the adjacent assembly, thus freeing the ledge 48. In FIG. 3, the chaindotted line 49 shows diagrammatically the limit of support of the adjacent assembly on the ledge 48. Said assembly is located by means of a notch 50 formed in the ledge 48.

The device thus provided for measuring neutron flux in a nuclear reactor offers many advantages over design solutions which were known in the prior art and achieves an appreciable improvement in the installation described and claimed in U.S. Pat. No. 3,802,962 cited earlier. In particular, the device under consideration makes it possible to obtain neutron flux values of at least $2\times10^7$ n/cm$^2$/s, thus attaining a minimum count rate of at least two counts per second even at the time of reactor shutdown. Moreover, since the neutron guide is intended to be mounted in place of an assembly, the tube which is filled with inert gas and serves to guide the neutrons produced by the pins of the emissive medium offers the advantage of having the largest permissible diameter corresponding to that of a support sleeve of the reactor diagrid. A number of guides of the type described above can advantageously be mounted in the reactor core and spaced at uniform intervals around this latter. In particular three guides can be placed at angular intervals of 120° about the axis and mounted at the limit of the core zone which contains the fissile assemblies and of the lateral blanket of fertile assemblies.

Among the neutron-emissive media, it will be preferable to choose the sodium-stainless steel medium since this latter provides the best performances and especially makes it possible to exclude any fissile or fertile material, with the result that the neutron guide has a long service life. Finally, a further advantage of the device proposed arises from the possibility of separate removal of the two portions constituting the guide. Thus the upper element can be simply withdrawn from the diagrid in the same manner as any core assembly. The lower element (which is intended to be removed only under exceptional circumstances) can be released from the receiving support sleeve by means of a special handling tool or simply withdrawn after removal of an assembly, depending on the alternative form of construction which is adopted.

It is readily apparent that the invention is not limited to the example of construction which has been more especially described in the foregoing with reference to the drawings but extends on the contrary to all alternative forms.

What we claim is:

1. A device for measuring neutron flux in a nuclear reactor comprising a vessel which contains a liquid medium for cooling the reactor core formed by the juxtaposed arrangement of fertile fuel assemblies and blanket assemblies disposed in a vertical position, each assembly aforesaid being provided with an open-topped wrapper having an axial extension in the form of a bottom end-fitting for positioning the assembly in a diagrid by means of a support sleeve in which said end-fitting is inserted, the device aforesaid being provided with at least one neutron detection chamber placed beneath the reactor vessel externally and as close as possible thereto and with a neutron guide located vertically above said detection chamber and constituted by a tubular casing occupied at least partially by an inert gas and extending from the reactor core to the immediate vicinity of the bottom of the reactor vessel, said casing being provided with a wrapper having an external profile which is identical with that of the reactor core assemblies and with a positioning end-fitting which penetrates into a support sleeve of the reactor diagrid, wherein the neutron guide is constituted by two superposed and separable elements, the first and upper element being such as to contain on the one hand a neutron-emissive medium which extends at least over the greater part thereof above the central plane of the reactor core and on the other hand beneath said emissive medium a closed tube filled with inert gas and engaged coaxially within the second and lower element, said second element being positioned within the interior of the support sleeve and adapted to terminate at the lower end thereof in another closed tube filled with inert gas and placed in the line of extension of the closed tube of the first element so as to terminate in the vicinity of the internal surface of the bottom of the reactor vessel.

2. A device according to claim 1, wherein the neutron-emissive medium contained in the first element is constituted by a bundle of parallel pins of stainless steel immersed in sodium.

3. A device according to claim 2, wherein the spacer grids fixed on the pins of the bundle serve to brace the pins with respect to each other.

4. A device according to claim 2, wherein the pins of the bundle are attached at the upper ends thereof to the internal wall of the wrapper of the first element.

5. A device according to claim 1, wherein the inert gas filled tube of the first element determines with the internal wall of the wrapper an annular space provided for the circulation of the coolant liquid which penetrates into said space through holes formed in the lower portion of said wrapper.

6. A device according to claim 1, wherein the second element is attached to the support sleeve by remote-uncoupling means such as a claw-type, ball-type or bayonet-type locking system.

7. A device according to claim 1, wherein the second element is provided at the upper end thereof with a projecting ledge in cooperating relation with the lower end of the wrapper of an adjacent assembly in order to secure said element after positioning within the reactor core.

8. A device according to claim 1, wherein the support sleeve has an upper tubular end-piece in coaxial relation with the end-fitting of the first element and adapted to terminate at a level which is different from that of the other support sleeves of the reactor diagrid.

9. A device according to claim 1, wherein the end-fitting of the first element penetrates into the open tubular top portion of the second element and leaves a space which communicates with the exterior of the second element by means of lateral orifices through which the coolant liquid passes.

* * * * *